(12) United States Patent
Chilton

(10) Patent No.: US 6,220,454 B1
(45) Date of Patent: Apr. 24, 2001

(54) COMPACT IN-TANK FUEL FILTER

(75) Inventor: Hugh G. Chilton, Findlay, OH (US)

(73) Assignee: Kuss Corporation, Findlay, OH (US)

( * ) Notice: Subject to any disclaimer, the term of this patent is extended or adjusted under 35 U.S.C. 154(b) by 0 days.

(21) Appl. No.: 09/109,212

(22) Filed: Jun. 30, 1998

(51) Int. Cl.$^7$ .................................................. B01D 27/06
(52) U.S. Cl. ........................ 210/483; 210/172; 210/232; 210/238; 210/416.4; 210/459; 210/460; 210/461; 210/462; 210/463; 210/486; 210/487; 210/493.3; 210/494.1
(58) Field of Search .................................. 156/202, 204, 156/217; 210/232, 238, 459, 460, 461, 486, 487, 500.31, 494.1, 172, 493.3, 356, 463, 416.4, 462

(56) References Cited

U.S. PATENT DOCUMENTS

| | | |
|---|---|---|
| 426,945 | 4/1890 | Maignen . |
| 2,023,423 | 12/1935 | Kleckner .................. 210/165 |
| 2,079,366 | 5/1937 | Thomas .................... 210/164 |
| 2,488,726 | 11/1949 | Judkins .................... 210/169 |
| 2,491,180 | 12/1949 | Horthy ..................... 210/169 |
| 2,697,522 | 12/1954 | Lawrence .................. 210/164 |
| 3,280,985 | 10/1966 | Czerwonka ................. 210/489 |
| 4,239,625 | 12/1980 | Hlavinka .................. 210/321.3 |
| 4,386,948 | * 6/1983 | Choksi et al. . |
| 4,479,874 | 10/1984 | Rosenberg et al. ......... 210/445 |
| 4,517,090 | 5/1985 | Kersten et al. ........... 210/493.2 |
| 4,743,370 | * 5/1988 | Mizusawa . |
| 5,665,229 | 9/1997 | Fitzpatrick et al. ....... 210/232 |

FOREIGN PATENT DOCUMENTS 649682   12/1928   (FR) .

* cited by examiner

Primary Examiner—W. L. Walker
Assistant Examiner—Michael A. Fleming
(74) Attorney, Agent, or Firm—Brinks Hofer Gilson & Lione

(57) ABSTRACT

A compact, high capacity in-tank fuel filter defines a large surface area while simultaneously occupying a relatively small space and defining a small footprint. The filter comprises a body of filtration media and an outlet fitting which is integrally molded to the filtration media and provides communication from the interior of the filter to an associated fuel pump to which it is typically mounted. The filtration media of the body is folded upon itself in a multiple accordion fold configuration and sealed along the non-folded edges. The resulting surface area to size (footprint) ratio provides improved flow capacity, reduced pressure drop and extended service life.

14 Claims, 3 Drawing Sheets

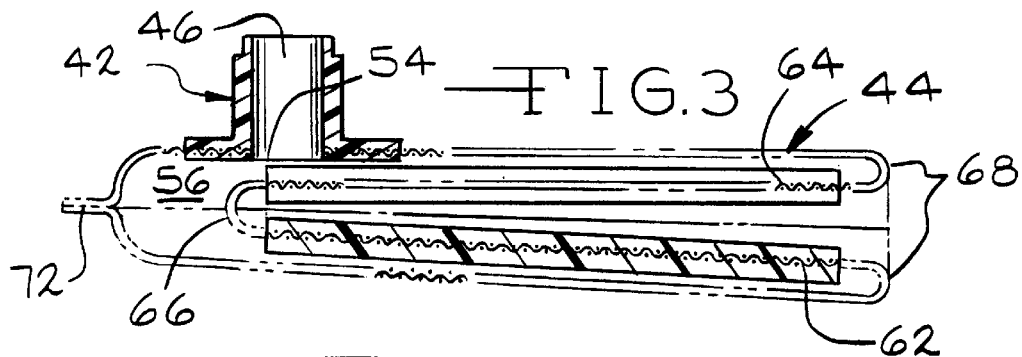
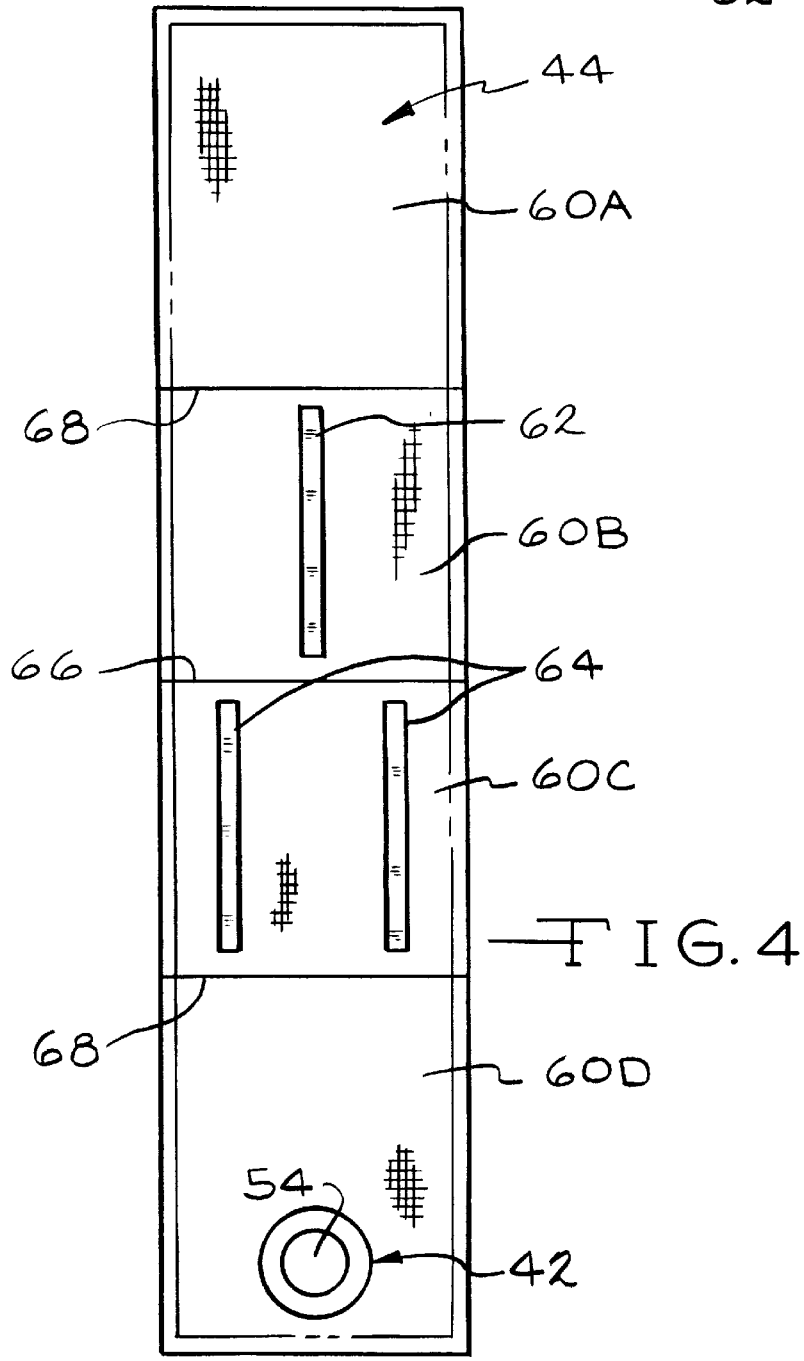

COMPACT IN-TANK FUEL FILTER

BACKGROUND OF THE INVENTION

The invention relates generally to in-tank fuel filters and more specifically to an in-tank fuel filter having both compact size and relatively large surface area. The sophistication of modern vehicle fuel systems, particularly fuel injection systems, necessitates use of the cleanest possible fuel. Cleanest is currently defined as carrying contaminants such as foreign particulate matter having a size of less than about 100 microns. In order to satisfy these requirements, vehicle manufacturers have adopted two stage filtration schemes utilizing a first, relatively coarse fuel filter disposed in the fuel tank and a second finer, readily replaceable fuel filter in the engine compartment.

Generally speaking, the in-tank fuel filter is assembled to an in-tank fuel pump. The fuel pump is then installed in an opening in the fuel tank. Alternatively, the fuel pump may be combined with a fuel level sensor and the resulting module is similarly installed in the fuel tank. In addition to the fuel cleanliness requirements, disposition of the fuel filter in the vehicle fuel tank is often subject to constraints regarding the filter size inasmuch as vehicle manufacturers tend to prefer smaller openings in the fuel tank. Moreover, many desirable operational characteristics of fuel filters such as low pressure drop, high flow rate and extended service life are in direct conflict with the demand for reduced size. One approach to achieving both compact size and relatively large surface area and thus low pressure drop and long service life involves providing folds or pleats in the filtration media. U.S. Pat. No. 2,079,366 discloses a filter including a bag-like filter element having folds which provide a relatively large filtration area. Wire screening is placed between the folds to define separate flow channels. U.S. Pat. No. 4,479,874 to Rosenberg et al. discloses a plural layer filter having a filtration element which is folded into sections.

From the foregoing prior art, it is apparent that improvements in the art of compact, relatively high flow rate in-tank fuel filters are desirable.

SUMMARY OF THE INVENTION

A compact, high capacity in-tank fuel filter defines a large surface area while simultaneously occupying a relatively small space and defining a small footprint. The filter comprises a body of filtration media and an outlet fitting which is integrally molded to the filtration media and provides communication from the interior of the filter to an associated fuel pump to which it is typically mounted. The filtration media of the body is folded upon itself in a multiple accordion fold configuration and sealed along its non-folded edges. The resulting surface area to size (footprint) ratio provides improved flow capacity, reduced pressure drop and extended service life. In the preferred embodiment, molded runners separate the layers of filtration media, prevent collapse of the media and ensure fuel flow. In an alternate embodiment, a fabric stuffer is disposed within the interior of the filter to provide the same function.

Thus it is an object of the present invention to provide an in-tank fuel filter having both a compact configuration and relatively high flow rate capability.

It is a further object of the present invention to provide a compact, high capacity in-tank fuel filter having at least one internal accordion pleat.

It is a still further object of the present invention to provide a compact, high capacity in-tank fuel filter having a folded or convoluted body with a peripheral seal along three edges.

It is a still further object of the present invention to provide a compact, high capacity in-tank fuel filter having an outlet fitting integrally molded to the fabric body.

It is a still further object of the present invention to provide a compact, high capacity in-tank fuel filter having in-situ molded runners or a stuffer to separate the fabric layers.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 3 is a full, sectional view of a compact in-tank fuel filter according to the present invention;

FIG. 4 is a top, plan view of the fabric body of a compact in-tank fuel filter according to the present invention and preassembly configuration.

DESCRIPTION OF THE PREFERRED AND ALTERNATE EMBODIMENT

Figure 1:
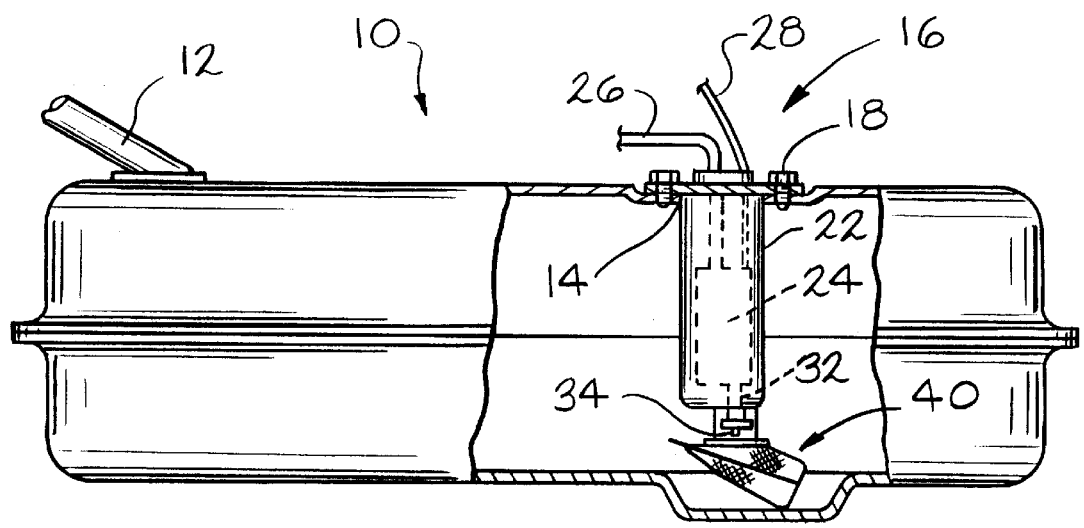
FIG. 1 is side, elevational view of a motor vehicle fuel tank with a portion broken away to reveal an in-tank filter and fuel pump assembly incorporating the present invention.

Referring now to FIG. 1, a typical vehicle fuel tank is illustrated and generally designated by the reference number 10. The vehicle fuel tank 10 may be fabricated of formed, welded metal or blow molded plastic and includes an inlet or fill tube 12 which receives fuel such as gasoline, gasohol or other alternative fuel from a source exterior to a vehicle and directs it to the interior of the vehicle fuel tank 10 as will be readily understood. The fuel tank 10 defines an opening 14 which sealingly receives an electric fuel pump assembly 16 which is secured to the fuel tank 10 by a plurality of threaded fasteners 18 or other securement means such as a threaded ring (not illustrated). The fuel pump assembly 16 includes a fuel pump housing 22 which receives, isolates and protects a fuel pump 24. The fuel pump 24 provides fuel under pressure to a fuel outlet line 26. A cable 28 having one or two conductors provides electrical energy to the fuel pump 24 in accordance with conventional practice. The fuel pump assembly 16 may also include a fuel level sensor and suitable output cable (both not illustrated).

As also illustrated in FIG. 1, the fuel pump 24 includes a depending, preferably cylindrical suction or inlet fitting 32 having an inlet opening in fluid communication with the suction side of the fuel pump 24. Radially spaced from the inlet fitting 32 and parallel thereto is a positioning or registration pin 34. The registration pin 34 preferably has a stepped, cylindrical configuration and depends from and is secured to or integrally formed with a bottom portion of the fuel pump housing 22.

Figure 2:
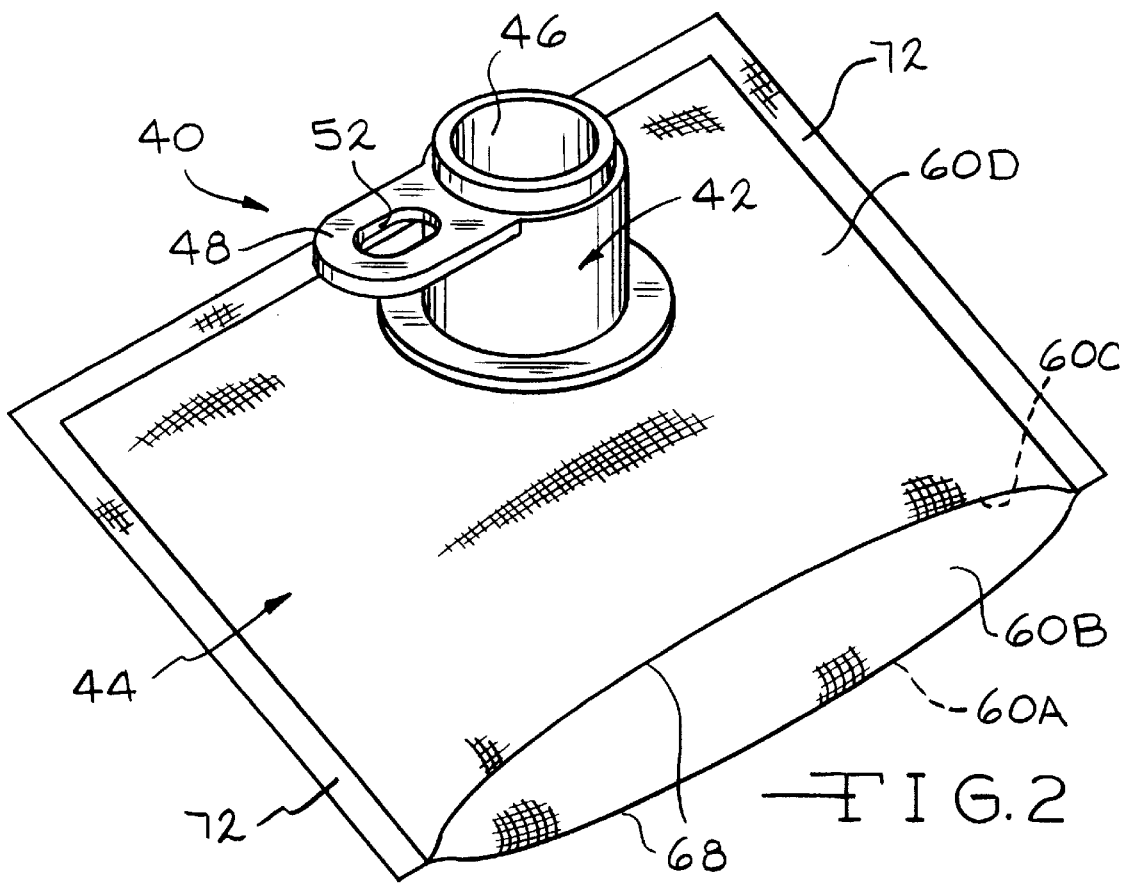
FIG. 2 is an enlarged, perspective view of a compact in-tank fuel filter according to the present invention.

With reference now to FIGS. 1, 2 and 3, disposed generally on the bottom of the vehicle fuel tank 10, secured about the inlet fitting 32 and oriented properly by the registration pin 34 is a fuel filter assembly 40. The fuel filter assembly 40 includes an outlet fitting or stack 42 and a multiply folded filtration media body 44. The filtration media body 44 before folding is a swatch of preferably nylon, polyester or acetal woven or extruded fabric, material or non-woven filtration media. Other materials having appropriate fuel compatibility and stability may also be utilized. The swatch may be rectangular and elongate, square or define any other suitable shape which, when folded, will define the desired final shape and filter configuration. The swatch of filtration media may be a single, unitary layer of material or may include multiple layers having, for example a coarser, outer layer having larger pores and a finer, inner layer having smaller pores. Typical pore size of the fabric, material or media and thus the nominal particle size capable of passing through the filtration fabric is preferably on the order of 30 to 100 microns and may vary from 10 to 200 microns.

The outlet stack 42 defines an outlet opening 46 which is suitably sized to be press fit and frictionally retained on the inlet fitting 32 of the fuel pump housing 22. Extending radially outwardly from the outlet stack 42 is a tab or lug 48 defining an oblong opening or aperture 52. The opening 52 cooperates with the registration pin 34 on the fuel pump housing 22 to ensure that the fuel filter assembly 40 is properly mounted to the fuel pump assembly 16 and thus properly positioned within the fuel tank 10. A star washer (not illustrated) may be placed on the portion of the registration pin 34 extending through the tab or lug 48 to assist retention of the fuel filter assembly 40 on the fuel pump assembly 16. The outlet stack 42 is preferably in situ molded of a fuel and filtration media compatible material such as nylon, polyester or acetal about an aperture 54 formed in the filtration media body 44 of the fuel filter assembly 40. So configured and mounted, the outlet stack 42 provides fluid communication from an interior region 56 of the filtration media body 44 and its exterior, particularly the fuel pump 24.

Referring now to FIGS. 3 and 4, it will be appreciated that the fuel filter assembly 40 according to the present invention exhibits relatively large surface area and thus high flow rate and long service life and relatively low pressure drop for its relatively small footprint. These features are achieved by providing the filtration media body 44 in a multiply folded or convoluted configuration. In FIG. 4, the filtration media body 44 is illustrated in flat, preassembly configuration. As such, the filtration media body 44 preferably includes four continuous, adjacent panels: a first panel 60A, a second panel 60B, a third panel 60C and a fourth panel 60D. In order to maintain separation of the layers of the filtration media body 44 in a convoluted configuration and to ensure and maintain adequate fuel flow notwithstanding the suction generated by the fuel pump 24, a first longitudinal runner 62 is molded in situ in the second panel 60B. Disposed in a laterally staggered arrangement with the first longitudinal runner 62 are a pair of spaced-apart, parallel runners 64 which are molded in situ in the third panel 60C. As noted above, the outlet fitting 42 is in situ molded in the fourth panel 60D.

As illustrated in preassembly configuration in FIG. 4 and assembled configuration in FIG. 3, the elongate swatch of filtration media forming the filtration media body 44, including the panels 60A, 60B, 60C and 60D, is folded in one direction along a reference center fold line 66 and folded in the opposite direction along two reference edge fold lines 68.

In its assembled configuration illustrated in FIGS. 2 and 3, the two reference edge fold lines 68 generally define outer edges of the filtration media body 44 and the center fold line 66 is disposed within the filtration media body 44 generally adjacent the outlet stack 42. The three other edges of the filtration media body 44 are aligned and then sealed by the application of ultrasonic energy to form sealed edges 72. Radio frequency energy, vibration welding, infrared or other heat energy processes which achieve autogenous bonding or fuel and fabric compatible adhesives may be utilized to effect such sealed edges 72. The sealed edges 72 thus close off the interior space 56 along three sides of the fibration media body 44. It will be appreciated that the fibration media body 44 may define shapes other than square or rectangular, such as, for example, triangular or polygonal and that in such cases where N equals the number of sides of the fabric body, N−1 sides or edges will be sealed and the remaining side or edge will be folded. It will also be appreciated that the filtration media body 44 may include multiple, i.e., two, three, four, five or more pleats or folds and thus that a fuel filter assembly 40 according to the present invention may somewhat resemble an accordion.

When secured to an assembly such as the fuel pump assembly 16 illustrated in FIG. 1, it will be appreciated that all four panels 60A, 60B, 60C and 60D participate in the filtration of fuel as it passes from the interior of the fuel tank 10 through the filtration media body 44, into the interior region 56, through the outlet fitting or stack 42 and into the fuel pump 24. The large surface area relative to the small footprint is apparent by reference to and comparison of FIGS. 2 and 4. The small footprint of the fuel filter assembly 40 facilitates installation into a relatively small sized opening 14 of the fuel tank 10. Nonetheless, the fuel filter assembly 40 according to the present invention provides a surface area approximately twice that achieved by conventional fabric filter having only upper and lower filtration panels. The fuel filter assembly 40 of the present invention provides this reduced footprint and pressure drop while at the same time providing increased fuel flow and service life.

Figure 5:
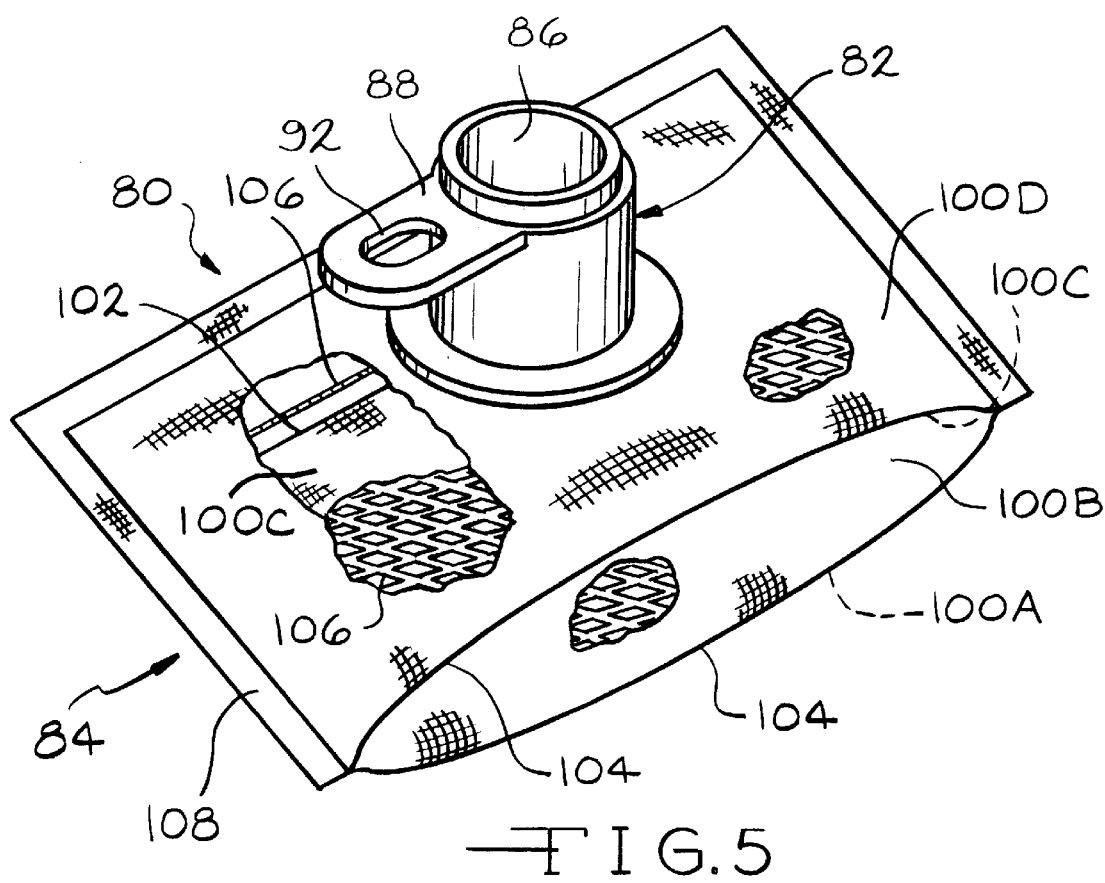
FIG. 5 is an enlarged, perspective view with portions broken away of a first alternate embodiment compact in-tank fuel filter according to the present invention.

Referring now to FIG. 5, a first alternate embodiment compact in-tank fuel filter assembly is illustrated and designated by the reference number 80. The first alternate embodiment compact fuel filter assembly 80 includes an outlet fitting or stack 82 and a fabric body 84. The outlet stack 82 is in all respects identical to the outlet stack 42 of the preferred embodiment filter assembly 40 and includes a through passageway 86 which provides communication to the interior of the filtration media body 84, a radially extending projection or lug 88 and an oblong opening or aperture 92 in the lug 88 which receives the registration pin 34 on the fuel pump housing 22 and properly registers the in-tank fuel filter assembly 80 relative thereto.

The filtration media body 84 is again prepared from a unitary elongate swatch of filtration media which may be woven, non-woven or extruded nylon, polyester, acetal or other suitable material and includes a first, lower panel 100A, a second, intermediate panel 100B, a third, intermediate panel 100C and a fourth, upper panel 100D. The panels 100A, 100B, 100C and 100D are folded along a reference center fold line 102 in one direction and a pair of reference edge fold lines 104 in the opposite direction. Rather than utilizing the in situ molded separators or runners 62 and 64, however, the first alternate embodiment fuel filter assembly 80 includes a folded swatch of relatively rigid, large weave extruded or woven fabric known in the art as a stuffer 106. The stuffer 106 functions in a manner similar to the runners 62 and 64 to keep the panels of media 100A, 100B, 100C and 100D separated, thereby facilitating fuel flow to the outlet fitting 82 and out the passageway 86. The reference edge fold lines 104 define adjacent, parallel edges of the in-tank fuel filter assembly 80 and the other non-folded and aligned edges are sealed by use of autogenous bonding processes such as ultrasonic bonding, vibration welding, radio frequency sealing or heat or an adhesive to achieve the edge seal or seam 108. It will be appreciated that the first alternate embodiment fuel filter assembly 80 achieves the same desirable operational characteristics as the preferred embodiment fuel filter assembly 40.

The foregoing disclosure is the best mode devised by the inventor for practicing this invention. It is apparent, however, that devices incorporating modifications and variations will be obvious to one skilled in the art of fuel filters. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A compact, in-tank fuel filter comprising, in combination, a filter body and an outlet fitting mounted on said filter body, said filter body assembled from a unitary swatch of filtration media having a through opening and a first center fold in one direction, a pair of edge folds in an opposite direction and a seal along each remaining edge, said edge folds and said sealed edges defining an interior region and said outlet fitting providing communication with said interior region through said opening.

2. The compact in-tank fuel filter of claim 1 further including runners formed on said filtration media.

3. The compact in-tank fuel filter of claim 1 further including a stuffer disposed in said interior region of said filter body.

4. The compact in-tank fuel filter of claim 1 wherein said outlet fitting includes a radially extending lug defining an aperture.

5. The compact in-tank fuel filter of claim 1 wherein said filtration media defines a rectangle, divided into at least four panels and said outlet fitting is formed on one of said panels and further including runners formed on two of said panels adjacent said center fold.

6. The compact in-tank fuel filter of claim 1 wherein said filtration media is selected from the group consisting of nylon, polyester and acetal.

7. The compact in-tank fuel filter of claim 1 wherein said filtration media has a pore size of from 10 microns to 200 microns.

8. A compact, in-tank fuel filter comprising, in combination, a filter body prepared from a swatch of filtration material having edges, said filtration material defining an aperture and folded to define a first center fold in one direction, a pair of adjacent edge folds in an opposite direction and a seal along said edges, said edge folds and said edges defining an interior and an outlet fitting formed on said filtration material about said aperture and providing communication with said interior.

9. The compact in-tank fuel filter of claim 8 further including runners formed on said filtration material.

10. The compact in-tank fuel filter of claim 8 further including a stuffer disposed in said interior of said filter body.

11. The compact in-tank fuel filter of claim 8 wherein said outlet fitting includes a radially extending lug defining an aperture.

12. The compact in-tank fuel filter of claim 8 wherein said filtration material defines an elongate rectangle divided into at least four panels and said outlet fitting is formed on an end adjacent one of said panels and further including runners formed on two of said panels adjacent said center fold.

13. The compact in-tank fuel filter of claim 8 wherein said filtration material is selected from the group consisting of nylon, polyester and acetal.

14. The compact in-tank fuel filter of claim 8 wherein said filtration material has a pore size of from 10 microns to 200 microns.

* * * * *